June 10, 1947.   H. S. HUFF   2,422,100
POSITION DETERMINING SYSTEM
Filed Jan. 6, 1943   3 Sheets-Sheet 3

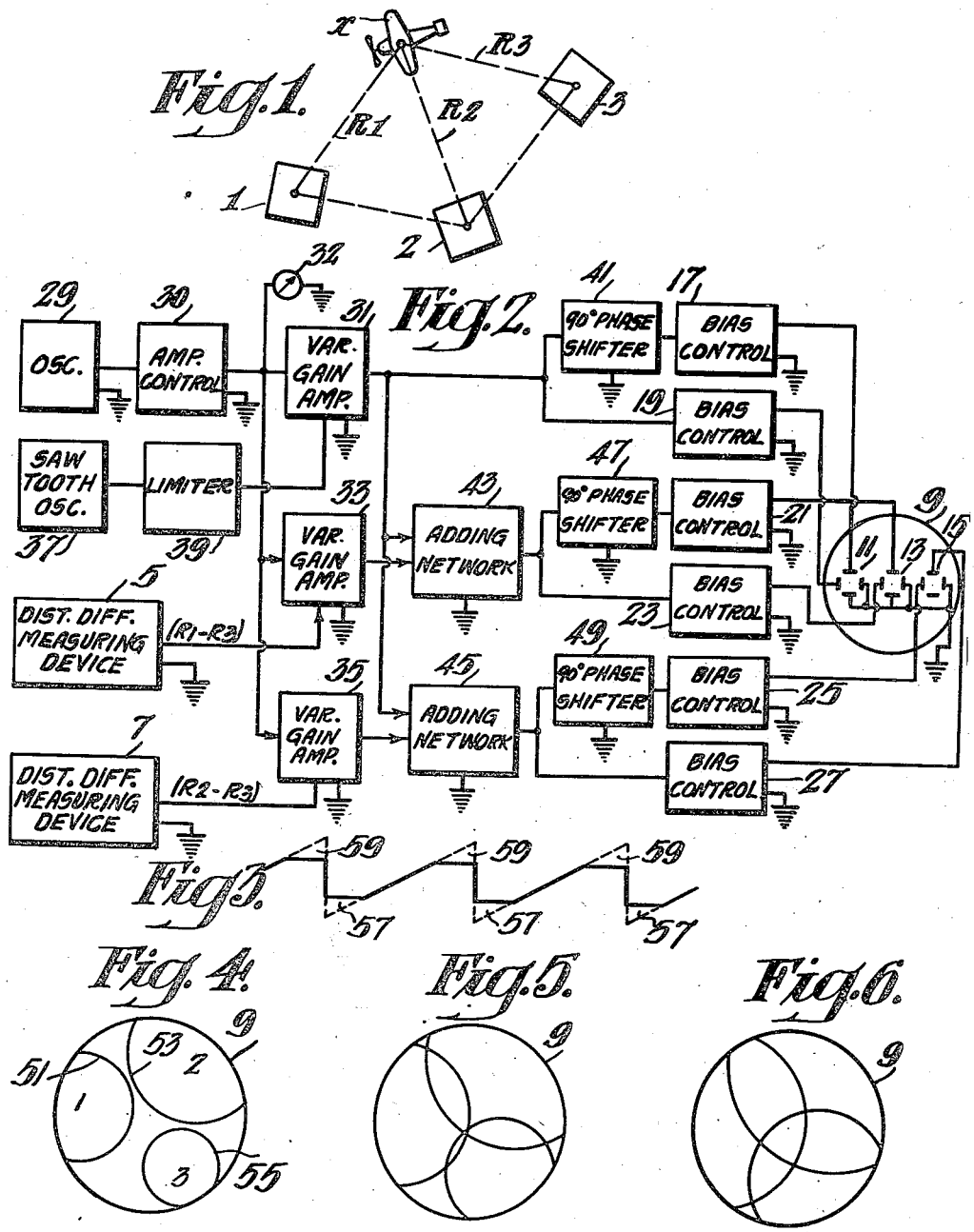

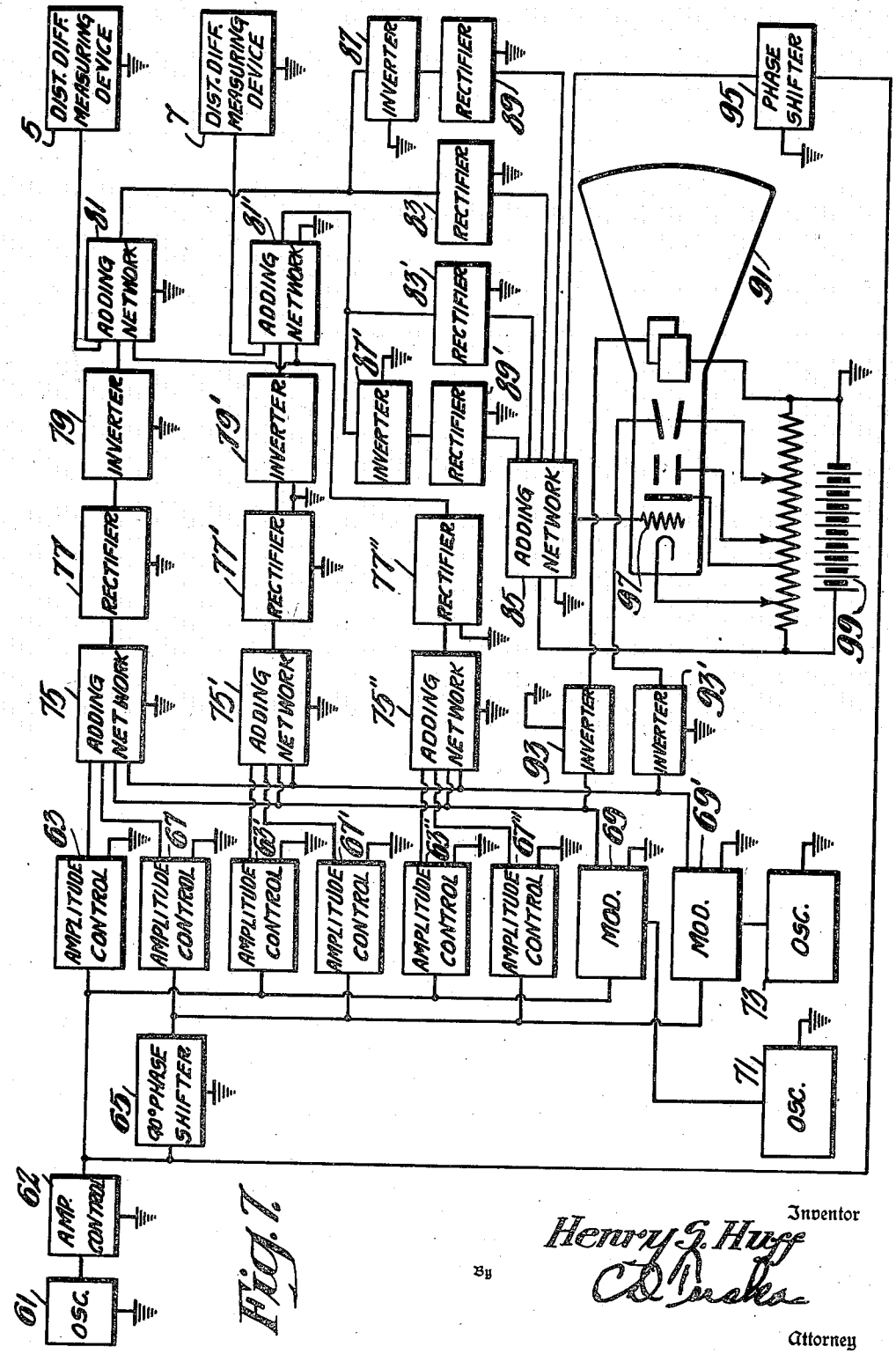

Inventor
Henry S. Huff
By
CD Tuska
Attorney

Patented June 10, 1947

2,422,100

UNITED STATES PATENT OFFICE 2,422,100

POSITION DETERMINING SYSTEM

Henry S. Huff, Princeton, N. J., assignor to Radio Corporation of America, a corporation of Delaware Application January 6, 1943, Serial No. 471,415

8 Claims. (Cl. 250—11)

1

This invention relates to position determining systems and more particularly to means for indicating automatically and continuously the position of a mobile craft by means of measurements based on the time required for signals to travel to said mobile craft from a plurality of fixed reference stations.

Various systems have been devised for measuring the distance between two stations by radiating a signal from one station and using the signals received at a second station to cause a transmitter at said second station to radiate a similar signal back to the first station. The received retransmitted signal is compared in phase or frequency with the initial signal to provide an indication of the time required for the signal to travel between the two stations, and hence the distance between the two stations. The signals may be timed pulses of radiant energy or frequency modulated waves; under some conditions sound or supersonic waves may be used. Two or more reference stations are used and the position of the mobile station is determined by triangulation.

Under some circumstances it is desirable to avoid transmission from the mobile station. This may be done by using three or more fixed stations, interconnected by transmission lines or other synchronizing means so as to transmit in timed relationship. These signals are compared at the mobile station, providing information in the form of differences of the wave propagation times from the several fixed stations to the mobile station. The present invention is concerned with position indication in response to distance difference measurements such as are provided by the above described method.

Accordingly it is the principal object of this invention to provide an improved method of and means for computing and indicating the position of a mobile station in response to radiation travel time difference measurements.

Another object is to provide an improved system for performing said operations automatically and continuously.

A further object of the invention is to provide means whereby said results are secured without resort to mechanical linkages or cumbersome circuit arrangements.

Figure 8:
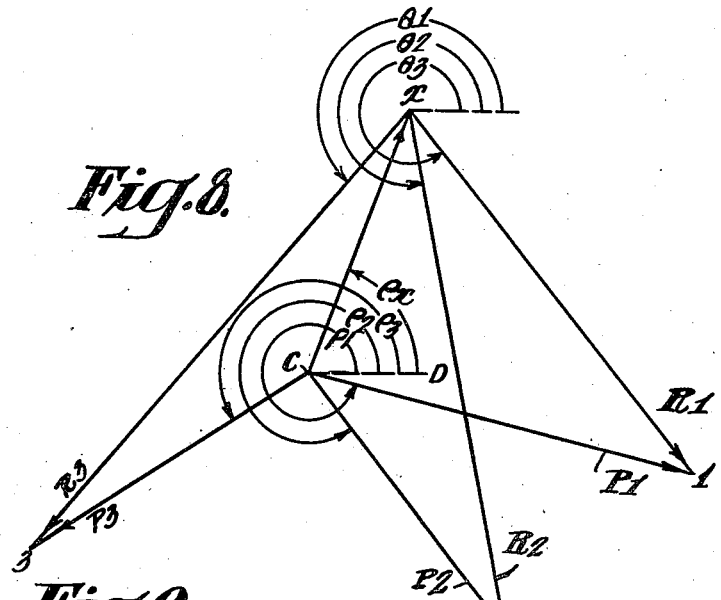

These and other incidental objects will become apparent to those skilled in the art upon consideration of the following description, with reference to the accompanying drawings of which Fig. 1 is a schematic diagram illustrating the arrangement of the fixed reference stations, Fig. 2 is a schematic block diagram of an embodiment of the invention, Fig. 3 is a graphical representation of one of the voltages occurring in the operation of the system of Fig. 2, Figs. 4, 5 and 6 show typical indications produced by the system of Fig. 2, Fig. 7 is a schematic block diagram of a modified embodiment of the invention, Fig. 8 is a vector diagram illustrating the operation of the system of Fig. 7 and Figs. 9, 10 and 11 are circuit diagrams illustrating the details of portions of the system of Fig. 7.

Referring to Fig. 1, reference stations 1, 2 and 3 are provided at fixed or predetermined locations. Each of the reference stations includes a transmitter arranged to radiate signals bearing pulses, frequency modulation, or other distinctive timing modulation. These signals are received at a station carried by a mobile craft, $x$. The distances of the craft $x$ from the mobile stations 1, 2 and 3 respectively are designated $R1$, $R2$ and $R3$. The mobile station includes devices responsive to the relative timing of the signals received from the reference stations.

Referring to Fig. 2, the distance difference measuring devices 5 and 7 are arranged to produce D.-C. voltages proportional in magnitude to the differences $R1-R3$ and $R2-R3$ respectively. Each of the devices 5 and 7 includes receiver means responsive to transmissions from the reference stations, and a pulse interval timer circuit if pulse transmissions are used, or beat frequency responsive means such as a counter circuit if frequency modulated signals are employed. One suitable pulse interval timer circuit is described in U. S. Patent 2,092,887 issued September 14, 1937, to D. G. C. Luck. A suitable counter circuit is described in British Patent 471,731 of December 4, 1935, to E. L. C. White. In either case, pulsating direct currents are produced, having average values proportional to the radiation travel time differences. The pulsating currents may be passed through low pass filters to provide smooth D. C. for operation of the system described herein.

A three gun cathode ray tube 9 is provided, with deflection systems 11, 13 and 15. The deflection system 11 is connected to bias control circuits 17 and 19, and the deflection systems 13 and 15 are similarly connected to bias control circuits 21, 23 and 25, 27 respectively. An oscillator 29 is connected through an amplitude control 30 to the input circuits of variable gain amplifiers 31, 33 and 35. A second oscillator 37 is connected through a limiter circuit 39 to the gain control circuit of the amplifier 31. The distance difference measuring devices 5 and 7 are connected to the gain control circuits of the amplifiers 33 and 35 respectively.

The output circuit of the amplifier 31 is connected to a pair of adding networks 43 and 45.

The output circuit of the amplifier 33 is connected to the network 43 and the output circuit of the amplifier 35 is connected to the network 45. The output circuit of the amplifier 31 is connected directly to the bias control network 19 and through a 90° phase shifter 41 to the bias control 17. The output circuits of the adding networks 43 and 45 are similarly connected through 90° phase shifters 47 and 49 to the bias controls 21 and 25 respectively, and directly to the bias controls 23 and 27.

The adjustment and operation of the system of Fig. 2 is as follows:

The amplitude control 30 is adjusted to a position corresponding to the map scale to be used. The control 30 may be calibrated directly in terms of the map scale, such as in units of miles per inch, or the output may be indicated on an A.-C. volt meter 32, calibrated in map scale units. The bias controls 17, 19, 21, 23, 25 and 27 are manually adjusted, like the usual centering controls of a cathode ray oscilloscope, to center the respective cathode ray spots on the screen of the tube 9 at points corresponding to the map positions of the reference stations 1, 2 and 3 respectively. The output of the oscillator 29 is split into two voltages in quadrature phase by the phase shifter 41. These voltages are applied through the bias networks 17 and 19 to the vertical and horizontal deflection circuits respectively of the deflection system 11, causing the cathode ray beam to produce a circular trace, 51, on the screen of the tube 9 about the point 1 as a center. See Fig. 4. Voltage from the oscillator 29 is similarly applied through the amplifier 33, the adding network 43, the phase shifter 47 and the bias controls 21, 23 to the deflection system 13, and through the amplifier 35, adding network 45, phase shifter 49, and bias controls 25, 27 to the deflection system 15. This produces a trace 53 about the point 2 and a trace 55 about the point 3.

The radius of the trace 51 is determined by the gain of the amplifier 31. The output of the amplifier 31 is added in the network 43 to that of the amplifier 33. Hence the radius of the trace 53 is proportional to the sum of the gains of the amplifiers 31 and 33. The radius of the trace 55 is likewise proportional to the sum of the gains of the amplifiers 31 and 35. The D.-C. output of the distance difference measuring device 5 controls the gain of the amplifier 33 so that said gain is equal to some constant K, multiplied by the measured distance difference $(R_1-R_3)$. The gain of the amplifier 35 is similarly controlled by the device 7 to provide the same proportionality to the measured distance difference $R_2-R_3$. Thus the radii of the traces 51 and 55 differ from the radius of the trace 53 by amounts proportional to the quantities $R_1-R_3$ and $R_2-R_3$ respectively. Now if the gain of the amplifier 31 is adjusted to a value of K times the distance $R_3$, the radii of the traces 51, 53 and 55 will be proportional to the actual distances $R_1$, $R_2$ and $R_3$ respectively. Under these conditions the three traces will necessarily intersect in a single point $x$ on the screen of the tube 9, as indicated in Fig. 5. This point is the map position of the mobile station. Although the magnitude of the quantity $R_3$ is unknown, the position of the point $x$ may be determined by increasing the gain of the amplifier 31 from substantially zero, observing the screen of the tube 9 until the three traces intersect in a single point.

This operation may be performed manually, or the traces may be swept radially in synchronism by means of the oscillator 37. With each cycle of the oscillator 37, the traces on the face of the cathode ray tube 9 will produce patterns varying from that of the type shown in Fig. 4 through that shown in Fig. 5 to that shown in Fig. 6. If the rate of radial sweep is sufficiently low, the operator may catch the indication "on the fly" noting the position of the point $x$ at the instant the traces intersect. It may be desirable to combine manual control with the sweeping operation. This may be done by adjustment of the limiter 39 to control the maximum gain of the amplifier 31. Referring to Fig. 3, the dotted line represents the output wave of the oscillator 37. The limiter 39 is adjusted to clip off the negative peaks of this wave as indicated by the solid line 57, providing relatively small circular traces about the points 1, 2 and 3 to aid the operator in adjusting or checking the adjustment of the bias controls. The positive peaks of the output wave of the oscillator 37 cut off at a level indicated by the solid lines 59. This level is adjusted to such a value that the traces 51, 53 and 55 expand to the positions indicated in Fig. 5 and remain at these radii for a period corresponding to the length of the line 59. Owing to the dwell in the radial sweep cycle, the traces will appear brighter at these radii, facilitating interpretation of the indications. With this method of operation, the frequency of the oscillator 37 may be made so high that the radial sweep velocity is great enough to prevent any visible illumination of the screen of the tube 9 except during the dwell periods.

The operator then merely adjusts the limiter 39 until the outer traces intersect at a single point. Thus the system operates by assuming a series of hypothetical values for the quantity $R_3$, and providing a distinctive indication when the correct value is assumed. The oscillator 37 and limiter 39 may be omitted, if desired, and the gain of the amplifier 31 controlled in some other way, such as by means of a manually operated gain control.

It may be desirable under some conditions to provide completely automatic indication, without the necessity for close observation of the indicator to catch the indication "on the fly," or the single manual adjustment of the radial sweep amplitudes required in the system of Fig. 2. This may be done by setting up A.-C. voltages vectorially related to the positions of the reference stations, and an additional voltage which cyclically varies both in phase and magnitude. These voltages are combined in the proper relationship to provide an indication when the variable voltage has a magnitude and phase corresponding to the position of the mobile station.

Referring to Fig. 7, an oscillator 61 is connected through an amplitude control 62 to amplitude controls 63, 63' and 63'', and through a 90° phase shifter 65 to amplitude controls 67, 67' and 67''. The oscillator 61 is also connected to a modulator 69 and through the phase shifter 65 to a modulator 69'. An oscillator 71 is connected to the control input circuit of the modulator 69, and an oscillator 73 is similarly connected to the modulator 69'. The output circuits of the amplitude controls 63 and 67 are connected to an adding network 75. The controls 63', 67' and 63'', 67'' are similarly connected to adding networks 75' and 75'' respectively. The output circuits of the modulators 69 and 69' are connected to the adding networks 75, 75' and 75''. The output circuits of the adding networks 75, 75' and 75'' are connected to rectifiers 77, 77' and 77'' respectively. The output circuits of the rectifiers 77 and 77' are connected through inverters 79 and 79' to adding networks 81 and 81' respectively. The output of the rectifier 77'' is connected directly to the adding networks 81 and 81'. The distance difference measuring devices 5 and 7 are connected to the adding networks 81 and 81' respectively. The output circuit of the adding network 81 is connected through a rectifier 83 to an adding network 85, and through an inverter 87 and a rectifier 89 to the adding network 85. The output of the adding network 81' is similarly connected through an inverter 87' and rectifiers 83' and 89' to the adding network 85. The oscillator 61 is connected through an adjustable phase shifter 95 to the adding network 85.

A cathode ray tube 91 is provided with its horizontal deflection system connected through an inverter 93 to the output circuit of the modulator 69, and its vertical deflection circuit connected through an inverter 93' to the modulator 69'. The output of the adding network 85 is connected to an intensity control electrode 97 of the tube 91. Bias voltage for the electrode 97 is derived from the power supply 99 and applied to the adding network 85.

The adjustment and operation of the system of Fig. 7 is as follows:

The amplitude controls 63 and 67 are adjusted in the same manner as the bias controls 17 and 19 in the system of Fig. 2, according to the position of the reference station 1. Referring to Fig. 8, the output of the control 63 is then P1 cosine $\rho^1$ where P is a voltage proportional to the distance of reference station 1 from an arbitrary point C. The constant of proportionality depends on the map scale to be used and is set in by means of the amplitude control 62. The angle $\rho^1$ is the bearing of the station 1 from the point C with respect to a reference line CD. The output of the amplitude control 67 is $j^{P1}$ sin $\rho^1$, and is in quadrature phase with respect to the output of the control 63. The outputs of the controls 63', and 63'', 67' and 67'' are similarly related to the positions of the stations 2 and 3 with respect to the point C. The amplitudes of the outputs of the modulators 69 and 69' are varied cyclically by the oscillators 71 and 73 respectively. The oscillators 61, 71 and 73 operate at different frequencies. The frequency of the oscillator 71 is several hundred times that of the frequency of the oscillator 73, and the frequency of the oscillator 61 is several hundred times that of the oscillator 71. Denoting the output of the modulator 69 as $-Px$ cosine $\rho x$, and that of the oscillator 69' as $-jPx$ sine $\rho x$, the voltage $-Px/\rho x$ will assume every value of amplitude between zero and some maximum, and every angle between zero and $2\pi$ during each cycle of the oscillator 73. During this period the vectors representing the voltages P1, P2 and P3 will rotate a very large number of times, depending on the ratio of the frequency of the oscillator 61 to that of the oscillator 73. Thus at one instant during each cycle of the oscillator 73, the magnitude and position of the voltage Px will be related to the map position x in the same manner as the voltages P1, P2 and P3 are related to the map positions 1, 2 and 3. When this condition exists, the output of the adding network 75 is $$\overline{P1} - \overline{Px} = \overline{R1}$$

a voltage which is similarly related to the line from point $x$ to point 1, and the outputs of the networks 75' and 75'' will be related in the same manner to the distances and directions of stations 2 and 3 from the point $x$. The absolute values of these voltages, which correspond to the scalar values of the respective distances, are obtained by means of the rectifiers 77, 77' and 77'' respectively. These rectifiers are provided with low-pass filter systems designed to reject the frequency of the oscillator 61. Thus the outputs of the rectifiers 77, 77' and 77'' comprise voltages which vary in amplitude, and are of values proportional to the respective distances R1, R2 and R3 when the voltage Px is of the correct magnitude and direction. The outputs of the rectifiers 77 and 77' are inverted in the inverters 79 and 79' and added to that of the rectifier 77'' in the adding networks 81 and 81' respectively, producing resultant voltages proportional to minus (R1—R3) and minus (R2—R3) respectively. The outputs of the devices 5 and 7, which are proportional respectively to the actual values of the corresponding distance differences, are also applied to the adding networks 81 and 81'.

Thus when the voltage Px is correct, the outputs of both of the networks 81 and 81' are zero. If the output of the network 81 has any finite positive value, it passes through the rectifier 83 to the adding network 85. If the output of the network 81 has a finite negative value it is inverted by the inverter 87 and passes through the rectifier 89 to the network 85. Regardless of the polarity of the output of the network 81, the polarity of the voltage applied to the network 85 is always the same. In the same manner, if the output of the network 81' is anything other than zero, a voltage of constant polarity is applied to the network 85. The output from the oscillator 61 and bias voltage from the source 99 are added to this voltage in the network 85. These latter voltages are adjusted to such values that the intensity control electrode 97 is normally biased to cut off the cathode ray beam of the tube 91, except at positive peaks of the output of the oscillator 61. The rectifiers 83, 83', 89 and 89' are so poled that their outputs, if any, tend to bias the electrode 97 toward cut off.

Thus the cathode ray beam of the tube 91 is cut off throughout the entire cycle of the oscillator 73 except for the single instant when the outputs of the rectifiers 83, 83', 89 and 89' are simultaneously zero, and the output of the oscillator 61 is at its peak value. At this one instant the voltage Px is of the proper magnitude and direction to deflect the spot to a position on the screen of the tube 91 corresponding to the map position of the mobile station. Owing to the fact that delays in the various voltages will be introduced by the rectifier, inverter and adding circuits, the output of the adding network 85 will remove the cut off bias from the electrode 97 at a short time after the desired voltage relations are established. This effect is compensated by adjusting the phase shifter 95 to provide the same delay in the voltage from the oscillator 61.

Figure 9:
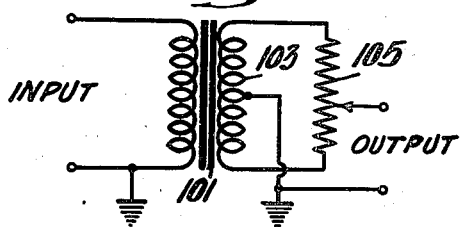

Fig. 9 shows a suitable circuit for the centering amplitude controls. Input is applied to a transformer 101 which is provided with a center tapped secondary 103. A potentiometer 105 is connected across the secondary, and the output is connected between the center tap of the secondary 103 and the adjustable arm of the potentiometer 105. This enables control of the output voltage over the range plus E to minus E.

Figure 10:
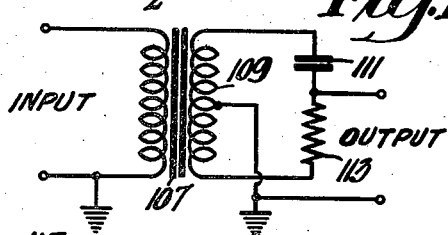

Fig. 10 shows a 90° phase shifter circuit. The input is applied to a transformer 107 provided with a center tapped secondary 109. A capacitor 111 and a resistor 113 are connected in series across the secondary 109. The output is connected between the center tap of the secondary 109 and the common junction between the capacitor 111 and the resistor 113. The reactance of the capacitor 111 is made equal to the resistance of the resistor 113 at the frequency at which the phase shifter is to operate. The circuit of Fig. 10 may also be used as a variable phase shifter such as is required at the circuit 95 in the system of Fig. 7. This may be done by varying either the resistor or the capacitor.

Figure 11:
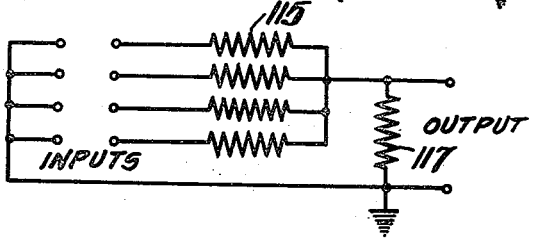

Fig. 11 shows a typical adding circuit. Each of the inputs which are to be added together is applied through a resistor 115 of relatively high value to a common output resistor 117 of relatively low value. The current through the resistor 117 as a result of any one input voltage is then substantially independent of the current produced by any other input voltage; the resultant voltage across the resistor 117 is substantially proportional to the sum of the input voltages.

Thus the invention has been described as an improvement in the art of determining the position of a mobile station with respect to the positions of fixed reference stations, using synchronized transmissions from the reference stations. Triangulation problems are solved by establishing voltages which are related to the known distances and/or angles, combining with these voltages a voltage which is cyclically varied, and producing a distinctive indication when said varying voltage corresponds to the unknown distance and/or direction.

I claim as my invention:

1. The method of producing an indication of the position of a mobile station with respect to the positions of a plurality of reference stations, comprising the steps of generating voltages corresponding to the respective differences in the distances of said reference stations from said mobile station, generating an additional variable voltage, adding said additional voltage separately to each of said first mentioned voltages to produce corresponding resultant voltages, varying said additional voltage, and producing an indication at the instant during the variation of said additional voltage when the magnitudes of said resultant voltages correspond respectively to the distances of said reference stations from said mobile station.

2. The method of indicating on the screen of a cathode ray tube the position of a mobile station with respect to the positions of a plurality of reference stations, comprising the steps of producing circular traces centered on said screen at points corresponding to the map positions of respective reference stations, controlling the radii of said traces so that they differ by amounts equal to the respective differences in the map distances of said reference stations from said mobile station, and adjusting all of said radii to such values that all of said traces intersect in a single point representing said position.

3. The method of determining the position of a mobile station with respect to the positions of a plurality of reference stations comprising the steps of producing voltages which differ from each other in magnitude by amounts proportional to respective differences in the distances of said reference stations from said mobile station, producing an additional alternating voltage of variable amplitude, adding said additional voltage to each of said first mentioned voltages to produce corresponding resultant voltages, and producing an indication at the instant during the period of variation of said additional voltage when the magnitudes of said resultant voltages are respectively proportional to the distances of said reference stations from said mobile station.

4. The method of producing an indication of the position of a mobile station with respect to the positions of a plurality of reference stations, comprising the steps of generating a plurality of alternating voltages vectorially related so as to correspond in magnitude and phase to respective distances and bearings of said reference stations from an abitrary reference point, generating an additional variable voltage, adding said additional voltage separately to each of said first mentioned voltages to produce corresponding resultant voltages, simultaneously varying said additional voltage over a predetermined range of amplitude and phase, whereby at one instant during said variation said additional voltage corresponds vectorially to the position of said mobile station with respect to said arbitrary reference point, and indicating the vectorial value of said additional voltage when the differences of said resultant voltages correspond respectively to the differences of the distances of said reference stations from said mobile station.

5. A system for indicating the position of a mobile station with respect to the positions of a plurality of reference stations in response to control voltages related in magnitude to respective differences in the distances of said reference stations from said mobile stations, including a source of alternating voltage, a plurality of variable gain control circuits connected to said source and arranged to provide output voltages respectively related in magnitude to said control voltages, an additional variable gain control circuit arranged to provide an additional output voltage, combining circuits connected to said gain control circuits so as to provide resultant outputs each proportional to the sum of said additional output voltage and a respective one of said first mentioned output voltages, a cathode ray tube, means for applying said resultant votages to the deflection circuits of said cathode ray tube to provide circular traces of radii respectively proportional to the amplitudes of said resultant voltages, and bias voltage control circuits connected to said deflection circuits for centering said circular traces respectively at the map positions of said reference stations.

6. A system for indicating the position of a mobile station with respect to the positions of a plurality of reference stations in response to control voltages related in magnitude to respective differences in the distances of said reference stations from said mobile stations, including a source of alternating voltage, a group of amplitude control circuits connected to said source, a 90° phase shifter connected to said source, a second group of amplitude control circuits connected to said phase shifter, a modulator connected to said source, a second modulator connected to said phase shifter, second and third sources of alternating voltage connected to said first and second modulators, a group of combining networks, each connected to one of said first group of amplitude control circuits, one of said second group of amplitude control circuits, and both of said modulators; a group of rectifiers connected respectively to said combining networks, a second group of combining networks connected to said rectifiers to compare the differences in the outputs thereof with said control voltages; a cathode ray tube provided with an intensity control electrode connected to said second group of combining networks and to said first source of alternating voltage, and deflection control means connected to said first and second modulators.

7. A system for indicating the position of a mobile station with respect to the positions of a plurality of reference stations, including a cathode ray tube, means for producing a group of voltages corresponding respectively to the positions of said reference stations with respect to an arbitrary center, means for producing a second group of voltages corresponding respectively to the differences in the distances of said reference stations from said mobile station, a source of cyclically varying voltage, means for combining said varying voltage separately with each member of said first group of voltages and a respective member of said second group of voltages to produce a third group of voltages varying cyclically between limits including values corresponding respectively to the position of said mobile station with respect to said arbitrary center, and means for applying said third group of voltages to said cathode ray tube to provide an indication upon the occurrence of equality in magnitudes of the members of said third group of voltages.

8. The method of indicating the position of a mobile station with respect to the positions of a plurality of reference stations comprising the steps of producing a first group of voltages corresponding to the positions of said reference stations with respect to a predetermined arbitrary point, producing a second group of voltages corresponding in their magnitudes to the respective differences in the distances of said reference stations from said mobile station, producing a further voltage which varies cyclically in magnitude, combining said further voltage separately with each of said second group of voltages to provide resultant voltages which vary cyclically between limits including values corresponding to the respective distances of said reference stations from said mobile station, combining said resultant voltages separately with individuals of said first group of voltages to provide a third group of cyclically variable voltages, and providing an indication in response to equality in magnitude of the members of said third group of voltages.

HENRY S. HUFF.

REFERENCES CITED

The following references are of record in the file of this patent:

UNITED STATES PATENTS

| Number | Name | Date |
|---|---|---|
| 2,148,267 | Honore | Feb. 21, 1939 |